N. M. HALE.
Guide-Wheels for Car-Trucks.

No. 156,922.  Patented Nov. 17, 1874.

WITNESSES:
Chas. Nida
O. Sedgwick

INVENTOR:
N. M. Hale
BY Munn & Co
ATTORNEYS.

UNITED STATES PATENT OFFICE.

NATHAN M. HALE, OF CLEBURNE, TEXAS.

IMPROVEMENT IN GUIDE-WHEELS FOR CAR-TRUCKS.

Specification forming part of Letters Patent No. 156,922, dated November 17, 1874; application filed August 1, 1874.

*To all whom it may concern:*

Figure 1:
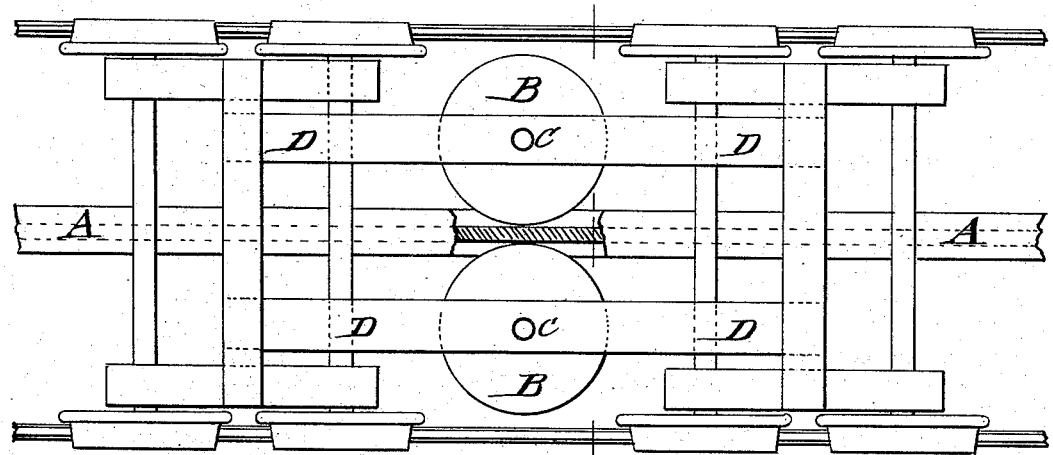
Figure 2:
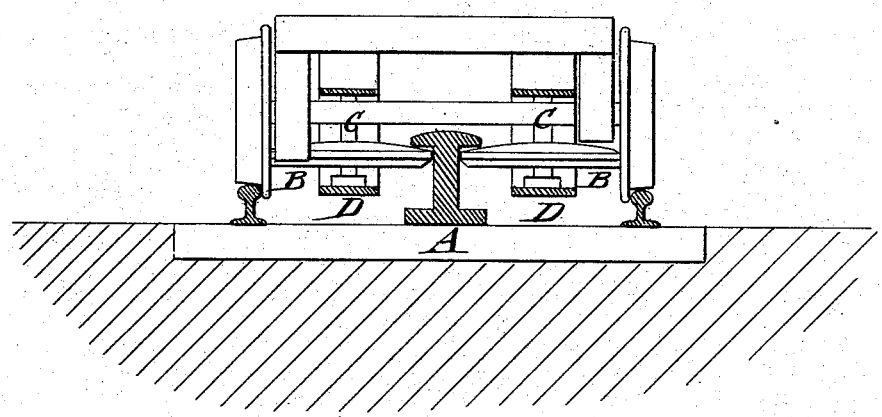

Be it known that I, N. M. HALE, of Cleburne, in the county of Johnson and State of Texas, have invented a new and Improved Device for Preventing Cars from being Thrown off the Track, of which the following is a specification:

In the accompanying drawing, Figure 1 represents a top view of my improved device or attachment to car-trucks, &c., for preventing their being thrown off the track; and Fig. 2 is a vertical transverse section of the same on the line $c\,c$, Fig. 1.

Similar letters of reference indicate corresponding parts.

The object of my invention is to attach to locomotives, passenger, freight, and other cars, a simple and effective device by which they are prevented from being thrown off the track. My invention consists in supporting horizontal wheels that run under the flanges of a central T-rail on springs, whose elasticity allows the wheels to rise and pass any obstacle without stopping the car or injuring the track, that allows the wheels to be fastened to cow-catcher, and renders unnecessary the elevation of the main rails to an equality with the central one.

In the accompanying drawing, A represents the third or middle rail, which is made of T shape, and placed either on a wooden base-strip to raise it to such height that the guide-wheels B may act on both sides under the flanged top while passing unobstructed over the cross-ties. The middle rail A may also be made entirely of iron, and provided with base-flanges to be firmly fastened in the usual manner to the ties. The guide-wheels B are hung by their axles C to supporting-bands D, which are stretched from truck to truck, or placed under the cow-catcher of the locomotive, or at any other part of the car, they being of a shape adapted to the construction of the car. There may be as many guide-wheels attached to a car as found most expedient in regard to the size and construction of the same. The upper side of the guide-wheel is, preferably, slightly convex, to bear under the flanged part of rail A, and retain thereby the car firmly and steadily on the track. The guide-wheels may be made solid, so as to turn in boxes, or hollow for turning on the journals convenient for oiling.

At street and other crossings, it is necessary to break off the middle rail for the easier passage of vehicles, the guide-wheels passing over the interval, and onto the continuation of the middle rail, bearing readily under the flanges by their turning in opposite directions. The side rails may be of a cheaper kind and simpler shape, for equalizing the increased cost of the middle rail as compared to the former track.

I claim as new, and desire to secure by Letters Patent—

In a car-truck, the horizontal wheels B B, supported upon horizontal longitudinal band-springs D D, combined as and for the purpose specified.

NATHAN M. HALE.

Witnesses:
    T. D. LORANCE,
    W. M. SCURLOCK.